Patented Feb. 5, 1952

2,584,137

UNITED STATES PATENT OFFICE 2,584,137

3-ACYLOXY-5,7,9(11)-ANDROSTATRIEN-17-ONE ADDUCTS

Robert H. Levin, A Vern McIntosh, Jr., and George B. Spero, Kalamazoo, Mich., assignors to The Upjohn Company, Kalamazoo, Mich., a corporation of Michigan No Drawing. Application November 20, 1950,
Serial No. 196,721

12 Claims. (Cl. 260—239.55)

The present invention relates to adducts of 3-acyloxy-5,7,9(11)-androstatrien-17-ones with certain dienophilic anhydrides and esters, and to a process for the production thereof. This application is a continuation-in-part of our prior filed copending application Serial 121,224, filed October 13, 1949.

The compounds of the present invention may be represented by the structural formula:

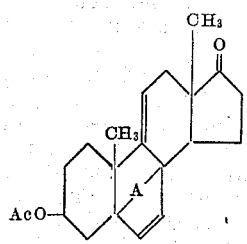

wherein Ac is the residue of an organic carboxylic acid, especially such acids containing from one to eight carbon atoms, inclusive; and A is an adduct radical of a dienophile selected from the group consisting of maleic anhydride and maleic acid diesters containing from one to eight carbon atoms, inclusive, in the esterifying group.

It is an object of the present invention to provide a novel group of compounds which are useful in the preparation of steroid compounds containing an oxygen atom at carbon atom eleven. Another object of the invention is the provision of a process for the production of the novel compounds, adducts of 3-acyloxy-5,7,9(11)-androstatrien-17-ones. Other objects of the invention will become apparent hereinafter.

The compounds of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, particularly those oxygenated at carbon atom eleven, as well as to investigate the biological activity of the adducts themselves and their transformation products. The importance of such investigation is moreover emphasized by the acute shortage of adrenal cortical hormones, and the absence of any present suggestion for alleviation of the said shortage except through organic synthesis.

Novel compounds of the present invention which are of particular interest are those compounds of the above generic formula wherein Ac represents the residue of a carboxylic acid containing up to and including eight carbon atoms. Among the acids which can be used are formic, acetic, propionic, butyric, valeric, hexanoic, heptanoic, octanoic, succinic, glutaric, cyclopentanoic, benzoic, toluic, and the like. Preferred acids are the lower-aliphatic acids. The acids may also contain substituents, such as halo, alkyl, and methoxy, which are non-reactive under the reaction conditions employed. The adduct bridge (—A—) in such compounds may be represented by the graphic formula:

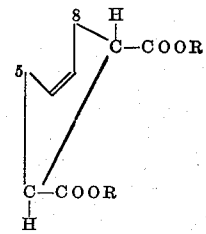

wherein R represents the organic residue of an alcohol. Such esters include the methyl, ethyl, propyl, isopropyl, butyl, isobutyl, lauryl, heptyl, octyl, cyclohexyl, cyclopentyl, benzyl and the like esters. The esterifying radical may also contain non-reactive substituents, such as halo, methoxy, or hydroxy, if desired. While the esters of the maleic acid adduct are described herein with particular reference to the methyl esters, the preferred embodiment of R is a lower-alkyl radical containing from one to eight carbon atoms, inclusive. Alternatively, the adduct may be depicted by the graphic formula:

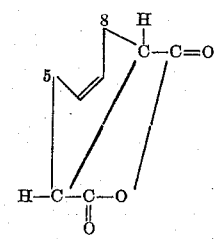

which is representative of the maleic anhydride adduct.

The compounds of the invention are usually colorless crystalline solids, which are soluble in ether, halogenated hydrocarbons, acetone, ethyl acetate, and benzene. The acid anhydride adducts are readily converted to the free 3-hydroxy acid adduct by hydrolysis. These acid or anhydride adducts in turn are readily converted into diester adducts by esterification with conventional reagents such as the diazoalkanes [Wilds et al., J. Org. Chem. 13, 763 (1948)]. Conversely, the diesters may be hydrolyzed to the dibasic acids which in turn may be converted into their corresponding anhydrides either by heat alone or preferably with a mild dehydrating agent such as acetic anhydride and the like.

The 3 - acyloxy-5,7,9(11)-androstatrien-17-one adducts of the present invention have the formula:

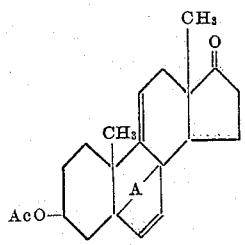

wherein A and Ac have the values given therefor above. These compounds are readily prepared from 3,20 - diacyloxy-5,7,9(11),17(20) -pregnatetraene adducts by dissolving the tetraene adduct in a suitable solvent, cooling to about minus eighty degrees to plus thirty degrees centigrade, and passing ozone or ozonized oxygen into the solution until about 1.0 to about 1.25 moles, preferably 1.0 to 1.1 moles, of ozone per mole of adduct have been absorbed. The addition of ozone to the 17:20 double bond is so rapid that only a small amount of ozone escapes from the reaction mixture, and the amount of ozone ordinarily required therefore closely approximates the theoretical amount. Any loss to the solvent must be taken into consideration in calculating the amount of ozone to be introduced. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the range are readily obtained by cooling the solution of the adduct with a bath of solid carbon dioxide in acetone or the like, although various other methods of cooling may be employed. Many of the customary solvents used in ozonizations, such as chloroform, methylene chloride, ethylene chloride, carbon tetrachloride, acetic acid, and the like, can be used for the ozonization reaction.

The 17:20 ozonides thus produced are then decomposed, according to the usual conditions known in the art. This can be conveniently accomplished by decomposing the ozonide in glacial acetic acid by the addition of finely-powdered zinc, or by the addition of a catalytic amount of a colloidal metal such as silver, platinum, or palladium, in which latter case reductive conditions, e. g., a hydrogen atmosphere, may also be employed. Alternatively, the decomposition can be conducted using hydrogen peroxide in an organic solvent, preferably glacial acetic acid.

As is conventional with decomposition of ozonides with zinc, when the ozonizations are conducted in solvents other than glacial acetic acid, the solvent used for the ozonization is replaced, after completion of the ozonization, by adding glacial acetic acid and removing the lower-boiling solvent by fractional distillation, or the solvent can be removed by careful warming under reduced pressure prior to the addition of acetic acid, if desired. After decomposition of the 17:20 ozonide and removal of the metal, the ketone can be recovered by diluting the acetic acid with water, or by other conventional procedure for the recovery of ketones, such as by formation of a carbonyl derivative, e. g., the 2,4 - dinitrophenylhydrazone. Recrystallization from acetone or the like results in a more highly purified ketone product.

The starting 3,20-diacyloxy-5,7,9(11),17(20)- pregnatetraene adducts have the formula:

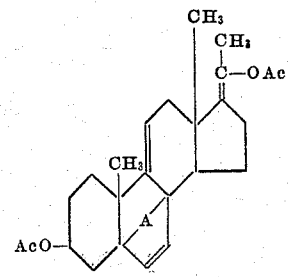

wherein A is an adduct radical derived from a dienophile selected from the group consisting of maleic acid anhydride and maleic acid diesters, and wherein AcO is an acyloxy group. These compounds are conveniently prepared by heating the corresponding 3-hydroxy- or 3-acyloxy- 5,7,9(11)-pregnatrien-20-one maleic acid, maleic acid anhydride, or maleic acid ester adduct with a large excess of an organic carboxylic acid anhydride in the presence of a small amount of para-toluene sulfonic acid. The mixture is heated at the boiling point of the anhydride until the anhydride is nearly completely removed, which usually requires about four hours when the amount of anhydride is about 150 milliliters, but which will vary with the amount of anhydride used. The preferred anhydride is acetic anhydride, but other anhydrides, such as propionic, butyric, valeric, hexanoic, heptanoic, and octanoic anhydrides, as well as benzoic acid anhydride, ortho-toluic acid anhydride, and the like are also operative. The acid anhydrides can also be substituted by non-reactive groups, such as halo, alkyl, and alkoxy, as in the case of chloroacetic, ortho-toluic, or methoxybenzoic acid anhydride. If a 3-hydroxy 20-keto adduct is thus reacted with an anhydride, the hydroxy group is usually acylated, and, similarly, if a maleic acid adduct is used instead of a diester or an anhydride, the anhydride will be formed. The enol ester can be isolated by carefully decomposing the residue, after distillation of the anhydride, with water and filtering off the solid ester, which product can be further purified by recrystallization from acetone-water, alcohol, or like solvents, if desired.

The 3-acyloxy-5,7,9(11)-pregnatrien - 20 - one adducts are conveniently prepared by the selective oxidation of an enol ester of an adduct of 3 - acyloxybisnor - 5,7,9(11) - cholatrien - 22 - al, represented by the formula:

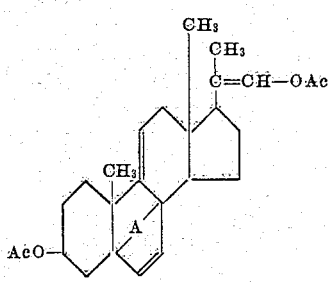

wherein A and Ac have the values previously given.

Adducts of 3,22 - diacyloxybisnor - 5,7,9(11), 20(22)-cholatetraenes [22-enol esters of 3-acyloxybisnor-5,7,9(11)-cholatrien-22-als] are conveniently prepared by subjecting an adduct of 3 - acyloxybisnor - 5,7,9(11) - cholatrien - 22 - al, of the formula:

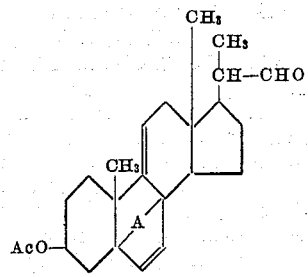

wherein A and Ac have the values previously given, to the action of an acid anhydride or an acid halide in the presence of an alkaline salt of the acid. The adducts of 3-acyloxy-bisnor-5,7,9 (11)-cholatrien-22-als can be prepared from adducts of 3-esters of dehydroergosterol by selective oxidation as described and claimed in the copending application Serial 111,100 of Robert H. Levin, filed August 18, 1949, and as more fully described hereinafter.

The 3-esters of dehydroergosterol, from which the 3 - acyloxybisnor-5,7,9(11)-cholatrien-22-al adducts are prepared, can be synthesized in several ways starting with ergosterol. For example, ergosterol can be transformed to dehydroergosterol with mercuric acetate according to known methods [Windaus et al., Ann. 465, 157 (1928)] and the 3-hydroxy group of the dehydroergosterol acylated by known procedure. Alternatively the 3-hydroxy group of ergosterol can be acylated prior to the preparation of the dehydro derivative, a procedure which is particularly preferred in the preparation of the 3-acetoxy derivative. The adducts of dehydroergosterol are then prepared by the addition of maleic anhydride or the like to dehydroergosterol or a 3-ester thereof according to known methods [Honigmann, Ann. 508, 89 (1934)]. The anhydrides can then be converted to their corresponding acids and esters if desired.

The ester group, when present in the 3-position of dehydroergosterol, is for the purpose of protecting the 3-hydroxy group in subsequent chemical reactions. For this purpose any convenient ester of an organic carboxylic acid, which is non-reactive under the conditions of the reaction is suitable. The preferred acids are the fatty acids such as formic, acetic, propionic, butyric, valeric, hexanoic, heptanoic, octanoic; dibasic acids such as malonic, succinic, phthalic; cycloaliphatic acids such as cyclopentanoic and cyclohexanoic; and aromatic acids such as benzoic, toluic, and the like. The acids may also contain substituents such as halogen, alkyl, the methoxy radical, and the like, and these substituents will be carried throughout the synthesis. If desired, the acyl group can be changed to another acyl group by saponifying the ester to give a 3-hydroxy compound, which can then be re-esterified as previously described.

A preferred method for preparing some of the dehydroergosteryl adducts comprises the saponification of a 3-acyloxy-adduct of dehydroergosterol with dilute alkali followed by acidification. The 3-hydroxy dicarboxylic acid thus formed can be converted to the 3-hydroxy anhydride by heat, or it can be converted to any desired 3-acyloxy anhydride adduct by heating under reflux with the appropriate acid anhydride or chloride in pyridine solution. Dialkyl esters of the previously mentioned dicarboxylic acid adducts can be prepared by subjecting the acids to the action of an esterification reagent such as a diazoalkane [Wilds et al., J. Org. Chem. 13, 763 (1948)], e. g., diazomethane, diazoethane, diazobutane, and the like.

The selective oxidation of an adduct of dehydroergosterol, or a 3-ester thereof, to produce an adduct of 3-hydroxybisnor-5,7,9(11)-cholatrien-22-al, or a 3-ester thereof, is accomplished by dissolving the dehydroergosteryl adduct in a suitable solvent, cooling to about minus 80 to plus 30 degrees centigrade, and passing ozone into the solution until about 1.0 to 1.25 moles of ozone per mole of adduct have been absorbed. The temperature of the solution should be maintained below plus 30 degrees centigrade, preferably between a temperature of minus 30 and minus 70 degrees centigrade, during the addition of ozone, although temperatures as low as minus 80 and as high as plus 30 degrees centigrade are operative. The lower temperatures of the preferred range are readily obtained by cooling the solution of the adduct with a bath of solid carbon dioxide in acetone or the like, although various other methods of cooling can be used. Many of the customary solvents used in ozonizations such as chloroform, acetic acid, carbon tetrachloride, ethylene chloride, methylene chloride, and the like, can be used.

The ozonides are then decomposed under reducing conditions, that is, in the absence of oxidizing agents, whether added or formed in the course of the reaction by products of decomposition of the ozonide. This means that excess oxygen formed by decomposition of the ozonide is prevented from forming hydrogen peroxide by combining with any moisture present, and that molecular oxygen is prevented from oxidizing the aldehyde thus formed. This can be conveniently accomplished by decomposing the ozonide in glacial acetic acid by the addition of finely-powdered zinc.

As is conventional with ozonizations when conducted in solvents, other than glacial acetic acid, the solvent used for ozonization is replaced, after completion of the ozonization, by adding glacial acetic acid and removing the lower-boiling solvent by fractional distillation. Alternatively, the solvent can be removed by careful warming under reduced pressure prior to the addition of glacial acetic acid, if desired.

After decomposition of the ozonide and removal of the zinc, the aldehyde can be recovered by diluting the acetic acid with water, or in other conventional manner, such as by formation of an aldehyde derivative, e. g., the dinitrophenylhydrazone.

Adducts of 3,22-diacyloxybisnor-5,7,9(11),20-(22)-cholatetraenes [22-enol-esters of adducts of 3-acyloxybisnor-5,7,9(11) - cholatrien-22-als] can be conveniently prepared by heating the corresponding 3-hydroxy or acyloxy aldehyde maleic acid, maleic acid anhydride, or maleic acid ester adduct with a large excess of an organic carboxylic acid anhydride in the presence of a small amount of the alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, and octanoic anhydrides, as well as benzoic acid anhydride, ortho-toluic acid anhydride, and the like, are also operative. The acid anhydrides can also be substituted by non-reactive groups, such as halo, alkyl, and methoxy, as in the case of chloroacetic, ortho-toluic, or methoxy-benzoic acid anhydrides. The reaction can be conveniently followed by observing the color changes in the reaction mixture, optimum yields being obtained by discontinuing the application of heat when the color of the solution changes from yellow to brown. Ordinarily the reaction is heated at about 140 degrees centigrade for from about four to six hours, but temperatures as low as 100 and as high as 180 degrees centigrade are also operative. The reaction is usually conducted at the boiling point of the anhydride, but in the case of the higher-boiling anhydrides, such as benzoic anhydride, a suitable temperature control, such as 100-150 degrees centigrade, must be used, since the adduct otherwise tends to decompose in the higher temperature range. If a 3-hydroxy aldehyde adduct is thus reacted with an anhydride, the hydroxy group will be acylated, and, similarly, if a maleic acid adduct is used instead of a diester or an anhydride, the anhydride will be formed. The enol ester can be isolated by removing the excess anhydride under reduced pressure and separating the enol ester from alkali metal salts, which procedure yields a product sufficiently pure for most purposes, but which can be further purified by recrystallization from acetone-water, acetone-pentane, or like solvents, if desired.

The ozonization of the thus-prepared enol acylate to prepare a 3-acyloxy-5,7,9(11)-pregnatrien-20-one adduct involves dissolving the enol ester in a suitable solvent, cooling to about minus eighty degrees centigrade to plus thirty degrees centigrade, and passing ozone, ozonized air, or ozonized oxygen into the solution until about 1.0 to about 1.25 moles, preferably 1.0 to 1.1 moles, of ozone per mole of adduct have been absorbed. The addition of ozone to the 20:22 double bond is so rapid that only a small amount of ozone escapes from the reaction mixture, and the amount of ozone ordinarily required therefore closely approximates the theoretical amount. Loss to the solvent, if any loss occurs, must be taken into consideration in calculating the amount of ozone to be introduced. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the range are readily obtained by cooling the solution of the adduct with a bath of solid carbon dioxide in acetone or the like, although various other methods of cooling may be employed. Many of the customary solvents used in ozonizations, such as chloroform, methylene chloride, ethylene chloride, carbon tetrachloride, acetic acid, and the like, can be used for the ozonization reaction.

The 20:22 ozonides thus produced are then decomposed under conditions normally employed for decomposition of such compounds. This can conveniently be accomplished by decomposing the ozonide with hydrogen peroxide, by hydrolysis, with zinc in glacial acetic acid, or by a catalytic amount of colloidal metal such as silver, platinum, or palladium in a solvent, such as glacial acetic acid, alcohol, or ethyl acetate, in which latter case reductive conditions, e. g., a hydrogen atmosphere, are also employed. The use of "reductive conditions" is well established in the art [Hill and Kelly, "Organic Chemistry," page 53, The Blackiston Company, Philadelphia (1934); Church et al., J. Am. Chem. Soc. 56, 176-184 (1934); Gilman "Organic Chemistry," second edition, page 636, John Wiley and Sons, New York (1943); Long, Chem. Reviews 27, 452-454 (1940)].

As is conventional with decomposition of ozonides with zinc, when the ozonizations are conducted in solvents other than glacial acetic acid, the solvent used for the ozonization is replaced, after completion of the ozonization, by adding glacial acetic acid and removing the lower-boiling solvent by fractional distillation, or the solvent can be removed by careful warming under reduced pressure prior to the addition of acetic acid, if desired. After decomposition of the 20:22 ozonide and removal of the metal, the ketone can be recovered by diluting the acetic acid with water, or by other conventional procedure for the recovery of ketones, such as by formation of a carbonyl derivative, e. g., the 2,4 - dinitrophenylhydrazone. Recrystallization from acetone or the like results in a more highly purified ketone product.

The following examples are illustrative of the process and products of the present invention, but are not to be construed as limiting.

*Preparation 1.—Dimethyl maleate adduct of dehydroergosteryl benzoate*

To a solution of 21 grams of dimethyl maleate adduct of dehydroergosterol in 69 milliliters of warm pyridine was added 9.5 milliliters of benzoyl chloride. After standing at room temperature for fifteen minutes, the mixture was poured into 1400 milliliters of ice-water and the solid removed by filtration, dried, and recrystallized from acetone. There was thus obtained 26.4 grams of dimethyl maleate adduct of dehydroergosteryl benzoate, melting at 203 to 205.5 degrees centigrade.

*Preparation 2.—Dimethyl maleate adduct of dehydroergosteryl acetate*

In a manner essentially that described in Preparation 1, the dimethyl maleate adduct of dehydroergosteryl acetate, melting at 177 to 179 degrees centigrade, was prepared from the dimethyl maleate adduct of dehydroergosterol and acetyl chloride.

*Preparation 3.—Dimethyl maleate adduct of dehydroergosteryl formate*

A solution of six grams of dimethyl maleate adduct of dehydroergosterol in fifty milliliters of 87 percent formic acid was heated under reflux for one hour, cooled, and the dimethyl maleate adduct of dehydroergosteryl formate filtered therefrom. Upon crystallization from acetone, the purified material melted at 177.5 to 178.5 degrees centigrade.

*Preparation 4.—Maleic acid adduct of dehydroergosterol*

A solution of 2.0 grams of sodium hydroxide in twenty milliliters of water was added to a solution of 1.73 grams of the maleic anhydride adduct of dehydroergosteryl acetate (M. P. 230-232 degrees centigrade) in forty milliliters of dioxane. The mixture solidified, but dissolved on addition of 300 milliliters of water and heating to eighty degrees centigrade. After half an hour the solution was cooled and made acid with aqueous three normal hydrochloric acid, to give 1.61 grams of precipitate. On crystallization from a dioxane-water mixture, the maleic acid adduct of dehydroergosterol melted at 190-192 degrees centigrade.

*Preparation 5.—Maleic anhydride adduct of 3-heptanoyloxydehydroergosterol*

The maleic acid adduct of dehydroergosterol from Preparation 4 was dissolved in a mixture of seven milliliters of warm pyridine and fourteen milliliters of heptylic anhydride, and the mixture heated under reflux for one hour. About eighty percent of the reaction solvent was removed under reduced pressure, and the residue then dissolved in methyl alcohol. The methyl alcohol solution was concentrated and cooled to yield 4.8 grams of the maleic anhydride adduct of 3-heptanoyloxydehydroergosterol, melting at 186-191.5 degrees centigrade.

*Preparation 6.—Maleic anhydride adduct of 3-beta - acetoxy - bisnor - 5,7,9(11) - cholatrien-22-al*

A solution of 5.35 grams of the maleic anhydride adduct of 3-beta-acetoxydehydroergosterol in 107 milliliters of methylene chloride was cooled to about minus seventy degrees centigrade and ozonized until 505 milligrams of ozone had been absorbed. The temperature of the solution was then gradually raised to about plus ten to fifteen degrees centigrade, whereupon seventy milliliters of glacial acetic acid was added and the methylene chloride removed under reduced pressure. Seven grams of zinc dust was then added to the cold solution at a uniform rate over a period of ten minutes, while keeping the reaction temperature below plus twenty degrees centigrade. After being stirred for fifteen minutes, the mixture was filtered and the filtrate poured into water. There was thus obtained 4.31 grams of maleic anhydride adduct of 3-beta-acetoxybisnor-5,7,9(11)-cholatrien-22-al, a fine white powder which melted at 187-197 degrees centigrade.

To a solution of 0.30 gram of the maleic anhydride adduct of 3 - beta - acetoxybisnor-5,7,9(11)-cholatrien-22-al, in thirty milliliters of ethanol, was added twenty milliliters of alcohol containing one percent 2,4 - dinitrophenylhydrazine and three percent concentrated hydrochloric acid. The mixture was allowed to stand for one hour at room temperature and then placed in a refrigerator to complete precipitation of the yellow crystals. The precipitate was then collected and recrystallized from a mixture of chloroform and alcohol, to give the 2,4-dinitrophenylhydrazone of the maleic anhydride adduct of 3 - beta - acetoxybisnor - 5,7,9(11) - cholatrien-22-al, melting at 269-271 degrees centigrade.

*Preparation 7.—Maleic anhydride adduct of 3-beta-acetoxybisnor-5,7,9,(11)cholatrien-22-al*

A two-liter, round-bottom flask was charged with fifty grams (0.93 mole) of dehydroergosteryl acetate maleic anhydride adduct and one liter of methylene chloride. The solution was cooled to Dry-Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 percent) of ozone being passed into the solution. The reaction mixture was transferred to a two-liter, round-bottom flask fitted with a capillary and a condenser for downward distillation, 300 milliliters of acetic acid added, and the methylene chloride distilled over in vacuo at forty degrees centigrade or below. The flask was then placed in a water bath and fitted with a stirrer. An additional 200 milliliters of acetic acid was added and the ozonide decomposed by the addition of fifty grams of zinc dust. The zinc dust was added in portions over a period of twenty to thirty minutes while the solution was stirred and the temperature maintained at seventeen to twenty degrees centigrade. After addition, the mixture was stirred for another twenty minutes and then filtered. The precipitated zinc dust was washed by filtering 100 milliliters of acetic acid therethrough, and the filtrate gradually diluted with water (1100 to 1200 milliliters) until the product had been drowned out. The product was then cooled in the refrigerator overnight and filtered. The yield of crystalline product was 42 grams, assaying 89-95 percent of the desired aldehyde.

*Preparation 8*

In a manner essentially that described in Preparation 6, the following compounds were prepared.

(1) Maleic anhydride adduct of 3-beta-formoxybisnor-5,7,9(11)-cholatrien-22-al, melting at 95-130 degrees centigrade. 2,4-dinitrophenylhydrazone, melting at 165-168 degrees centigrade.

(2) Maleic anhydride adduct of 3-beta-heptanoyloxyloxybisnor 5,7,9(11) - cholatrien-22-al, melting at 197.5-199 degrees centigrade. 2,4-dinitrophenylhydrazone, melting at 253-257 degrees centigrade.

(3) Dimethyl maleate adduct of 3-beta-benzoyloxybisnor - 5,7,9(11) - cholatrien-22-al, melting at 183-187 degrees centigrade. 2,4-dinitrophenylhydrazone, melting at 224-249 degrees centigrade.

(4) Dimethyl maleate adduct of 3-beta-acetoxybisnor-5,7,9(11)cholatrien-22-al, melting at 172-178 degrees centigrade. 2,4-dinitrophenylhydrazone, melting at 238 to 244 degrees centigrade.

(5) Dimethyl maleate adduct of 3-hydroxybisnor - 5,7,9(11)-cholatrien-22-al, melting at 163-170 degrees centigrade. 2.4-dinitrophenylhydrazone, melting at 250-254 degrees centigrade.

In a manner similar to the above, the maleic anhydride adduct of 3-hydroxybisnor-5,7,9(11)-cholatrien-22-al is obtained from dehydroergosteryl maleic anhydride adduct; the maleic acid adduct of 3-hydroxybisnor-5,7,9(11)-cholatrien-22-al is obtained from dehydroergosteryl maleic acid adduct; and 3 - acyloxybisnor - 5,7,9(11)-cholatrien-22-al maleic acid adducts are obtained from the maleic acid adduct of 3-acyloxydehydroergosterols.

*Preparation 9.—Dimethyl maleate adduct of 3-hydroxybisnor-5,7,9(11)cholatrien-22-al*

A solution of 2.69 grams (.005 mole) of the dimethyl ester of the maleic acid adduct of dehydroergosterol, in eighty milliliters of methylene chloride, cooled by a Dry-Ice and trichloroethylene bath, was treated with ozonized oxygen until 247.36 milligrams (.0051 mole) of ozone was absorbed. The solution was then allowed to warm to room temperature, whereafter thirty milliliters of acetic acid was added and the methylene chloride removed in vacuo. While cooling in a water-bath at fifteen degrees centigrade, four grams of zinc dust was added in portions with stirring, the temperature being maintained between fifteen and twenty degrees centigrade. Stirring was continued for another fifteen minutes, whereafter the zinc was separated by filtration. The filtrate was diluted with water to cloudiness, extracted with ether, the ether extract washed with sodium bicarbonate and then with water to neutrality, the solution then dried over sodium sulfate and evaporated to dryness in vacuo. The residue was crystallized from acetic acid and water, giving 1.92 grams (81.5 percent of the theoretical), melting point 91-97 degrees centigrade, which yielded a dinitrophenylhydrazone derivative in 72.5 percent yield, melting point 212-238 degrees centigrade. The aldehyde was recrystallized and found to have a purified melting point of 163-170 degrees centigrade, while the dinitrophenylhydrazone derivative was recrystallized until a melting point of 250-254 degrees centigrade was attained.

*Preparation 10.—Maleic anhydride adduct of 3-beta-acetoxy-22-acetoxybisnor-5,7,9(11),20(22-cholatetraene*

A mixture of twenty grams of the maleic anhydride adduct of 3-beta-acetoxybisnor-5,7,9(11)-cholatrien-22-al, six grams of anhydrous sodium acetate, and 600 milliliters of acetic anhydride, was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3-beta-acetoxy-22 - acetoxybisnor - 5,7,9(11),20(22)-cholatetraene, which melted at 186 to 193 degrees centigrade. Recrystallization of the crude product from a mixture of acetone and pentane raised the melting point to 200.5 to 202 degrees centigrade.

*Preparation 11*

In a manner essentially that described in Preparation 10, the following compounds were prepared:

(1) The dimethyl maleate adduct of 3-beta-benzoyloxy - 22-acetoxybisnor-5,7,9(11),20(22)-cholatetraene, which melted at 210 to 211 degrees centigrade.

(2) The dimethyl maleate adduct of 3-beta-acetoxy - 22 - acetoxybisnor - 5,7,9(11),20(22)-cholatetraene, which melted at 181 to 183 degrees centigrade.

In the same manner as given above 22-acyloxy, e. g., formoxy, acetoxy, propionoxy, butyroxy, valeroxy, hexanoyloxy, heptanoyloxy, octanoyloxy, benzoyloxy, naphthoyloxy, and the like 3-acyloxybisnor-5,7,9(11),20(22)-cholatetraene adducts, are obtained from the compounds of Preparation 6, 7, and 8. Such representative compounds include 3-formoxy-22-acetoxybisnor-5,7,9(11),20(22)-cholatetraene, 3-propionoxy-22-acetoxybisnor - 5,7,9(11),20(22) - cholatetraene, 3,22 - dipropionoxy-bisnor-5,7,9(11),20(22)cholatetraene, 3,22 - dibenzoyloxybisnor-5,7,9(11),20-(22) - cholatetraene, and 3-heptanoyloxy-22-octanoyloxybisnor - 5,7,9(11),20(22)-cholatetraene adducts with maleic anhydride or maleic acid esters such as the dimethyl maleate, diethyl maleate, dipropyl maleate, diisopropyl maleate, dibutyl maleate, dioctyl maleate, dibenzyl maleate, and the like.

*Preparation 12.—The maleic anhydride adduct of 3-beta-acetoxy-5,7,9(11)-pregnatrien-20-one*

A solution of 5.08 grams of the maleic anhydride adduct of 3-beta-acetoxybisnor-5,7,9(11)-cholatrien-22-al enol acetate in 100 milliliters of methylene chloride was cooled to about minus seventy degrees centigrade and ozonized until 483 milligrams of ozone had been absorbed. Fifty milliliters of glacial acetic acid was then added and the methylene chloride removed under reduced pressure. An additional thirty milliliters of glacial acetic acid was then added and the ozonide decomposed by adding seven grams of powdered zinc at a substantially uniform rate while maintaining the reaction temperature between seventeen and twenty degrees centigrade. The mixture was stirred for an additional twenty minutes, filtered, and the zinc washed with 140 milliliters of glacial acetic acid. The organic extracts were combined and diluted with seventy milliliters of water. When crystallization commenced, the rate of precipitation was increased by addition of two volumes of water. There was thus obtained 4.0 grams of the maleic anhydride adduct of 3-beta-acetoxy-5,7,9(11)-pregnatrien-20-one, which melted at 240 to 264.5 degrees centigrade. Several recrystallizations of the crude material from acetone raised the melting point to 263.5 to 264.5 degrees centigrade.

*Preparation 13.—Maleic acid adduct of 3-beta-hydroxy-5,7,9(11)-pregnatrien-20-one*

A solution of 4.52 grams (0.0100 mole) of the maleic anhydride adduct of 3-beta-acetoxy-5,7,9-(11)-pregnatrien-20-one, M. P. 263-264.5 degrees centigrade, in a mixture of 100 milliliters of 1,4-dioxane and 400 milliliters of water containing four grams (0.10 mole) of sodium hydroxide was allowed to stand at room temperature for two and one-half hours, whereupon a small quantity of plate-like crystals formed. These were dissolved by heating the mixture to seventy degrees centigrade for one-half hour. The reaction mixture was then made acid with fifty milliliters of three normal hydrochloric acid and refrigerated to give a precipitate of 3.05 grams of needle-like crystals melting at 173-177 degrees centigrade. On crystallization from a dioxane-water mixture, the compound melted at 211-215 degrees centigrade. The melting point was found to vary somewhat with the rate of heating.

Analysis:
Calculated for $C_{25}H_{30}O_6$: C 70.07 H 7.53
Found: C 69.80 H 7.47

*Preparation 14.—Dimethyl maleate of 3-beta-hydroxy-5,7,9(11)-pregnatrien-20-one*

A suspension of 0.400 gram of the maleic acid adduct of 3-beta-hydroxy-5,7,9(11)pregnatrien-20-one, in fifty milliliters of dry ether, was cooled in an ice-salt bath while a slight excess of diazomethane in methylene chloride was added over a 25 minute period with stirring. Ten minutes after addition was complete, the solution was placed on a steam bath and concentrated rapidly to dryness. The residue was crystallized from an acetone-water mixture to give 0.34 gram of the dimethyl maleate of 3-beta-hydroxy-5,7,9-(11)-pregnatrien-20-one, melting at 193-195 degrees centigrade. After chromatography and recrystallization, the compound melted at 192-197 degrees centigrade.

In the same manner as given above, other dialkyl maleates, e. g., the diethyl, dipropyl, diisopropyl, dibutyl, and dioctyl maleates of 3-hydroxy-5,7,9(11)-pregnatrien-20-one are prepared from 3-hydroxy-5,7,9(11)-pregnatrien-20-one maleic acid adduct and the appropriate diazoalkane, or by other equivalent esterification procedure.

*Preparation 15.—Dimethyl maleate of 3-beta-acetoxy-5,7,9(11)-pregnatrien-20-one*

A solution of 0.15 gram of the dimethyl maleate adduct of 3-beta-hydroxy-5,7,9(11)-pregnatrien-20-one, in 2.5 milliliters of acetic anhydride and 2.5 milliliters of pyridine, was heated on the steam bath for ninety minutes, cooled to room temperature, and poured into ice-water. The resulting precipitate was collected by filtration and found to melt at 205–209 degrees centigrade. Recrystallization from methanol gave the dimethyl maleate of 3-beta-acetoxy-5,7,9-(11)-pregnatrien-20-one, melting at 207–211 degrees centigrade.

Analysis:
Calculated for $C_{20}H_{38}O_7$: C 69.86 H 7.68
Found:                           C 69.81 H 7.86
                                 69.70    7.62

By the same manner of esterification, the following C-3 esters were prepared: (1) dimethyl maleate adduct of 3-beta-formoxy-5,7,9(11)-pregnatrien-20-one, melting point 223–230 degrees centigrade, and (2) the dimethyl maleate adduct of 3-beta-benzoyloxy-5,7,9(11)-pregnatrien-20-one, melting point 250–254 degrees centigrade.

*Preparation 16.—Maleic anhydride adduct of 3-beta-heptanoyloxy-5,7,9(11)-pregnatrien-20-one*

The maleic anhydride adduct of 3-beta-heptanoyloxy-5,7,9(11)-pregnatrien-20-one, melting point 170–171 degrees centigrade, was prepared by refluxing the maleic acid adduct of 3-beta-hydroxy-5,7,9(11)-pregnatrien-20-one with heptylic anhydride and pyridine for a period of twenty hours, and working up the reaction product in the usual manner.

*Preparation 17.—Maleic anhydride adduct of 3-beta-hydroxy-5,7,9(11)-pregnatrien-20-one*

Similarly, the maleic anhydride adduct of 3-beta-hydroxy-5,7,9(11)-pregnatrien-20-one, melting points about 195 degrees centigrade, was prepared by refluxing the maleic acid adduct of 3-beta-hydroxy-5,7,9(11)-pregnatrien-20-one with Dowtherm for eight hours. The 3-hydroxy-maleic anhydride adduct is also obtained by heating the 3-hydroxy maleic acid adduct to just above its melting point, which procedure causes water to be evolved, with the closing of the anhydride ring.

In the same manner as given above, still other 5,7,9(11)-pregnatrien-20-one adducts are prepared from the corresponding 3,22-diacyloxybisnor-5,7,9(11),20(22)-cholatetraene maleic acid anhydride, and maleic acid diester adducts. Such compounds include the 3-formoxy-5,7,9(11) pregnatrien-20-one maleic acid, maleic acid anhydride, dimethyl maleate, diethyl maleate, dibutyl maleate, dioctyl maleate, diisopropyl maleate, dibenzyl maleate, and like adducts; the corresponding 3-propionoxy, butyroxy, valeroxy, hexanoyloxy, heptanoyloxy, octanoyloxy, naphthoyloxy, benzoyloxy, and similar 20-ketone adducts, including, for example, 3-propionoxy-5,7,9(11)-pregnatrien-20-one dipropyl maleate, 3-benzoyloxy-5,7,(11)-pregnatrien-20-one dibenzoyl maleate, 3-heptanoyloxy-5,7,9(11)-pregnatrien-20-one dimethyl maleate, 3-valeroyl-oxy-5,7,9(11)-pregnatrien-20-one maleic acid anhydride adducts, and the like.

*Preparation 18.—Maleic anhydride adduct of 3-beta,20-diacetoxy-5,7,9(11),17(20)-pregnatraene*

A solution of 2.25 grams (.005 mole) of the maleic anhydride adduct of 3-beta-acetoxy-5,7,9(11)-pregnatrien-20-one and 0.95 gram of p-toluenesulfonic acid in 150 milliliters of acetic anhydride was distilled slowly for four hours, at the end of which period the twenty milliliters of acetic anhydride which remained was removed in vacuo. The residue was dissolved in ether, washed with five percent sodium bicarbonate and water, dried, and evaporated to dryness. The crude dark product was treated with Darco activated carbon and crystallized from alcohol to give 0.6 gram of crystalline maleic anhydride adduct of 3-beta-,20-diacetoxy-5,7,9(11),17(20)-pregnatetraene, melting at 196 to 217 degrees centigrade. After several recrystallizations from methanol, it melted at 217.5–219 degrees centigrade.

Analysis:
Calculated for $C_{29}H_{34}O_7$: C 70.42 H 6.93
Found:                          C 70.54 H 7.05

*Preparation 19*

In the manner of the preceding example, the following compounds were prepared:

(1) The dimethyl maleate adduct of 3-beta-,20-diacetoxy-5,7,9(11),17(20)-pregnatetraene, having a double melting point of 116–119 degrees and 164–168 degrees centigrade.

Analysis:
Calculated for $C_{31}H_{40}O_8$: C 68.86 H 7.46
Found:                           C 69.04 H 7.69
                                 68.71    7.80

(2) The dimethyl maleate adduct of 3-beta-acetoxy-20-propionoxy-5,7,9(11),17(20)-pregnatetraene having, by infra red spectroscopy, an absorption peak in the ester region at 1742 cm.$^{-1}$, characteristic of the C=C—O acyl grouping; and having lost the strong carbonyl absorption at 1700 cm.$^{-1}$ of the starting C-20 ketone.

In the same manner as given above, other 3,20-diacyloxypregnatetraene adducts are prepared, including 3,20-dipropionoxy-5,7,9(11),17(20)-pregnatetraene maleic anhydride adduct, 3-acetoxy,20-propionoxy-5,7,9(11),17(20)-pregnatetraene maleic anhydride adduct, 3-octanoyloxy-,20-octanoyloxy-5,7,9(11),17(20)-pregnatetraene dimethyl maleate adduct, 3-benzoyloxy-,20-acetoxy-5,7,9(11),17(20)-pregnatetraene diethyl maleate adduct, 3-butyroxy-,20-benzoyloxy-5,7,9(11),17(20)-pregnatetraene maleic anhydride adduct, 3-formoxy-,20-acetoxy-5,7,9-(11),71(20)-pregnatetraene dimethyl maleate adduct, 3,20-dibutyroxy-5,7,9(11),17(20)-pregnatetraene dibutyl maleate adduct, and the like.

*Example 1.—Maleic anhydride adduct of 3-beta acetoxy-5,7,9(11)-androstatrien-17-one*

A solution of 0.5 gram (.001 mole) of the maleic anhydride adduct of 3-beta-,20-diacetoxy-5,7,9(11),17(20)-pregnatetraene, in fifteen milliliters of methylene chloride, was cooled in a Dry-Ice bath and ozonized oxygen passed thereinto at a rate of 250 milliliters per minute until 1.15 molar equivalents of ozone had gone into the solution. The solution was then allowed to warm to room temperature, twenty milliliters of acetic acid added, and the methylene chloride removed in vacuo below forty degrees centigrade.

One gram of zinc dust was added in portions to the acetic acid solution over a period of ten minutes, while the temperature was maintained at seventeen to twenty degrees centigrade. After stirring for an additional twenty minutes, the zinc dust was removed by filtration and the filtrate gradually diluted with water until all of the product had been precipitated. Filtration after cooling gave 0.3 gram of maleic anhydride adduct of 3-beta-acetoxy-5,7,9(11)-androstatrien-17-one, melting at 130 to 170 degrees centigrade. Three recrystallizations from methanol raised the melting point to 218–221 degrees centigrade.

Analysis:
Calculated for $C_{25}H_{29}O_6$: C 70.73 H 6.65
Found: C 70.66 H 6.81

*Preparation 20.—Maleic anhydride adduct of 3-beta-benzoyloxy-5,7,9(11)-pregnatrien-20-one*

Seven and one-half grams of the maleic acid adduct of 3-beta-hydroxy-5,7,9(11)-pregnatrien-20-one (Preparation 13) was dissolved in ninety milliliters of pyridine and fifteen milliliters of benzoyl chloride was added thereto. The mixture was allowed to stand overnight at room temperature and was then poured into 1200 grams of crushed ice and water, resulting in formation of an oil which gradually solidified and was filtered off. The solid material was dissolved in acetone, treated with activated carbon, and crystallized from 125 milliliters of acetone diluted with 35 milliliters of water. This yielded 6.88 grams of 3-beta-benzoyloxy-5,7,9(11)-pregnatrien-20-one maleic anhydride adduct, melting point 219 to 224 degrees centigrade. Recrystallization from acetone resulted in a purer sample melting at 226.5 to 227.5 degrees centigrade.

*Preparation 21.—Maleic anhydride adduct of 3-beta-benzoyloxy-20-acetoxy-5,7,9(11),17(20)-pregnatetraene*

The maleic anhydride adduct of 3-beta-benzoyloxy-5,7,9(11)-pregnatrien-20-one (5.17 grams), 1.9 grams of para-toluene sulfonic acid, and 450 milliliters of acetic anhydride were combined and heated until the acetic anhydride began to distill. The rate of distillation was controlled in such a manner that, after four hours, about ten milliliters of acetic anhydride remained in the reaction flask. This was carefully decomposed with 400 milliliters of water and the resulting crude solid isolated and crystallized from 300 milliliters of alcohol to give 3.73 grams of 3-beta-benzoyloxy-20-acetoxy-5,7,9(11),17(20)-pregnatetraene maleic anhydride adduct, melting point 165–215 degrees centigrade.

*Example 2.—Maleic anhydride adduct of 3-beta-benzoyloxy-5,7,9(11)-androstatrien-17-one*

A solution of 1.0 gram of 3-beta-benzoyloxy-20-acetoxy-5,7,9(11),17(20)-pregnatetraene maleic anhydride adduct in sixty milliliters of methylene chloride was cooled with an acetone-Dry Ice bath and ozonized oxygen was passed thereinto until 100 milligrams of ozone had been absorbed. This required ten minutes. Twenty milliliters of acetic acid was added and the methylene chloride removed under reduced pressure. An additional ten milliliters of acetic acid was then added and the ozonide decomposed by adding 1.0 gram of powdered zinc in portions while the reaction mixture was being stirred and the temperature maintained between seventeen and twenty degrees centigrade. The mixture was stirred for an additional twenty minutes, filtered, and the zinc washed with twenty milliliters of acetic acid. The filtrate was diluted with 200 milliliters of water and cooled. The resulting solid residue was crystallized from alcohol-water, giving 3-beta-benzoyloxy-5,7,9(11)-androstatrien-17-one, melting point about 250–260 degrees centigrade.

In exactly the same manner, other 3-acyloxy-5,7,9(11)-androstatrien-17-one maleic anhydride, dimethyl maleate, diethyl maleate, dipropyl maleate, dibutyl maleate, diisopropyl maleate, diamyl maleate, dihexyl maleate, diheptyl maleate, dioctyl maleate, dibenzyl maleate and like adducts, wherein the 3-acyloxy group may be formoxy, acetoxy, propionoxy, butyroxy, valeroyloxy, hexanoyloxy, heptanoyloxy, octanoyloxy, benzoyloxy, and the like, are prepared from the corresponding 3-acyloxy-20-acyloxy-5,7,9(11),17(20)-pregnatetraene adducts.

*Example 3.—Dimethyl maleate adduct of 3-beta-acetoxy-5,7,9(11)-androstatrien-17-one*

The maleic anhydride adduct of 3-beta-acetoxy-5,7,9(11)-androstatrien-17-one (five hundred milligrams) was dissolved in five milliliters of methanol and an excess of diazomethane in fifty milliliters of methylene chloride added thereto. The solution was allowed to stand for one hour and then evaporated to dryness on the steam bath. The solid residue was chromatographed over alumina, giving a main fraction eluted with 98 percent benzene and two percent methanol. Crystallization from methanol-water gave 3-beta-acetoxy-5,7,9(11)-androstatrien-17-one dimethyl maleate adduct, melting at about 120–130 degrees centigrade.

The identical product is obtained by ozonization of 3-beta,20-diacetoxy-5,7,9(11),17(20)-pregnatetraene dimethyl maleate adduct after the manner of the preceding examples.

Other 17-ketone adducts prepared from the corresponding 3-substituted compounds in the manner given above include 3-propionoxy-5,7,9(11)-androstatrien-17-one maleic anhydride adduct, 3-butyroxy-5,7,9(11)-androstatrien-17-one maleic anhydride adduct, 3-valeroxy-5,7,9(11)-androstatrien-17-one dimethyl maleate adduct, 3-heptanoyloxy-5,7,9(11)-androstatrien-17-one maleic anhydride adduct, 3-octanoyloxy-5,7,9(11)-androstatrien-17-one diethyl maleate adduct, 3-isopropionoxy-5,7,9(11)-androstatrien-17-one maleic anhydride adduct, and the like, as well as the corresponding 3-hydroxy acid adduct 17-ketones, which are prepared by hydrolysis of the 3-acyloxy anhydride or maleate adducts; 3-acyloxy maleic acid adducts, prepared by reesterifying the 3-hydroxy group; and 3-hydroxy maleate adducts, which are prepared by reesterifying the free carboxyl groups in the 3-hydroxy maleic acid or anhydride adduct.

The compounds of the invention are useful as starting materials for the preparation of 3-acyloxy-9,11-oxido-5,7-androstadien-17-one adducts of the formula:

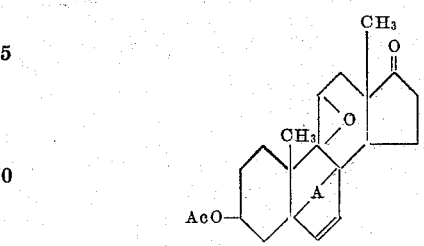

wherein A and Ac have the values previously assigned. These compounds are prepared by the selective oxidation of the corresponding 3-acyloxy-5,7,9(11)-androstratrien-17-one adduct using an organic peracid or hydrogen peroxide as the oxidant. Hydrogen peroxide is usually employed in the form of a twenty to ninety percent by weight aqueous solution, a thirty percent solution being preferred. The reaction is carried out by stirring the adduct and oxidant together, preferably in an organic medium which is non-reactive under the reaction conditions. Suitable media include chloroform, carbon tetrachloride, mixtures of ether and chloroform, glacial acetic acid, and many others. The ratio of oxygen-furnishing agent to steroid can be varied considerably within broad ranges. Ratois of up to twenty moles to one are operative, but ratios of from one to four moles per mole of steroid are preferred for attainment of optimum yields, the exact ratio being preferably varied inversely with the reaction time desired to be employed. The temperature of the mixture is usually maintained at from about zero degrees to about 100 degrees centigrade for a suitable period, e. g., from about one-half to twenty-four hours, depending on the concentration of oxygen-furnishing agent, and the 9,11-oxido compound then isolated in any convenient manner, such as by volatilizing the reaction medium, extracting the residue with chloroform, filtering, volatilizing the chloroform, and recrystallizing the residue, e. g., from eighty percent aqueous acetone. Alternatively, the compounds may be recovered by pouring the reaction product into water, filtering the solution, and drying the precipitate. The 9,11-oxido compound is usually obtained in a state of high purity after one or two recrystallizations. A convenient reaction medium when the oxidant is hydrogen peroxide is glacial acetic acid, and, when such is employed, the 9,11-oxido compound is separated readily by pouring the reaction product onto cracked ice to precipitate the 9,11-oxido compound, filtering, and recrystallizing the dried crude product, e. g., from ethyl acetate.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 3-acyloxy-5,7,9(11)-androstatrien-17-one adduct represented by the formula:

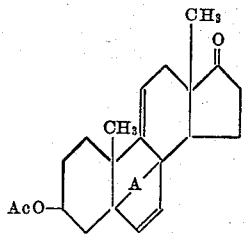

wherein Ac is the residue of an unsubstituted organic mono-carboxylic acid containing from one to eight carbon atoms, inclusive, and wherein A is an adduct radical of a dienophile selected from the group consisting of maleic acid anhydride and maleic acid lower-alkyl diesters, wherein the lower alkyl group contains from one to eight carbon atoms, inclusive.

2. A 3-acyloxy-5,7,9(11)-androstatrien-17-one maleic anhydride adduct, wherein the acyloxy group has the formula AcO, Ac being the residue of an unsubstituted organic mono-carboxylic acid containing from one to eight carbon atoms, inclusive.

3. 3 - acetoxy - 5,7,9(11) - androstatrien - 17 - one maleic anhydride adduct.

4. 3 - benzoyloxy - 5,7,9(11) - androstatrien - 17-one maleic anhydride adduct.

5. 3 - acetoxy - 5,7,9(11) - androstatrien - 17 - one maleic acid dimethyl ester adduct.

6. Process for the production of a 3-acyloxy-5,7,9(11)-androstatrien - 17 - one adduct which includes the step of ozonizing the 17:20 double bond in a 3,20-diacyloxy-5,7,9(11),17(20)-pregnatetraene adduct of the formula:

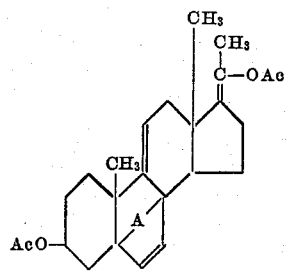

wherein Ac is the residue of an organic carboxylic acid containing from one to eight carbon atoms, inclusive, and wherein A is an adduct radical of a dienophile selected from the group consisting of maleic anhydride and maleic acid diesters wherein the esterifying groups contain from one to eight carbon atoms, inclusive, with from about 1.0 to about 1.25 moles of ozone per mole of starting pregnatetraene adduct, in an organic solvent for the reaction, at a temperature between about minus eighty and plus thirty degrees centigrade, decomposing the ozonide and isolating the 3-acyloxy - 5,7,9(11) - androstatrien-17-one adduct from the reaction product.

7. Process of claim 6, wherein the reaction temperature is between about minus thirty and minus seventy degrees centigrade.

8. Process of claim 6, wherein the ozonide is decomposed with zinc and glacial acetic acid.

9. Process of claim 6, wherein the starting adduct is the maleic anhydride adduct of 3,20-diacetoxy-5,7,9(11),17(20)-pregnatetraene.

10. Process of claim 6, wherein the starting adduct is the dimethyl maleate adduct of 3,20-diacetoxy-5,7,9(11),17(20)-pregnatetraene.

11. Process of claim 6, wherein the starting adduct is the maleic anhydride adduct of 3-benzoyloxy - 20 - acetoxy - 5,7,9(11),17,(20)-pregnatetraene.

12. Process of claim 6, wherein the starting adduct is a 3-acetoxy anhydride adduct.

ROBERT H. LEVIN.
A VERN McINTOSH, JR.
GEORGE B. SPERO.

No references cited.